Oct. 23, 1962 J. PAVEK 3,060,012
FERTILIZER CARTRIDGE INSERT
Filed Aug. 23, 1960
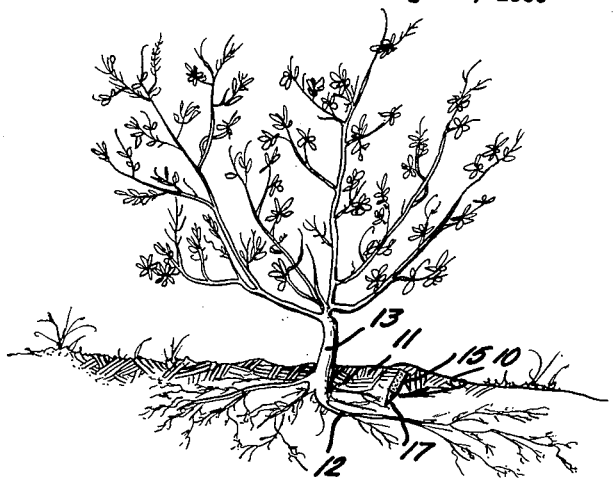
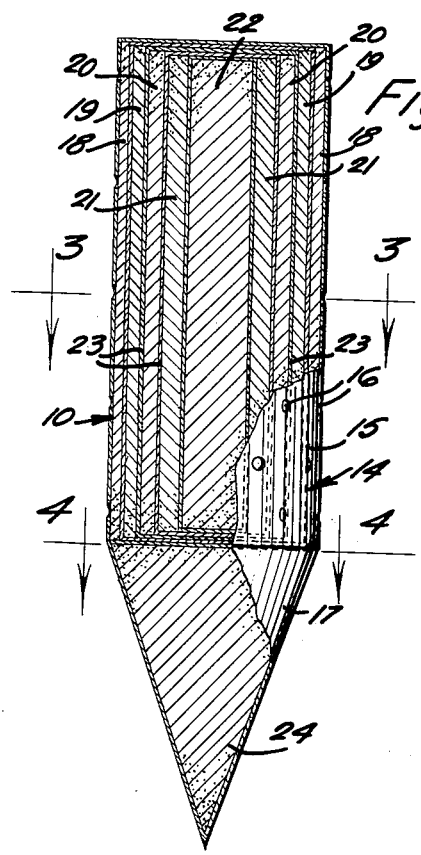
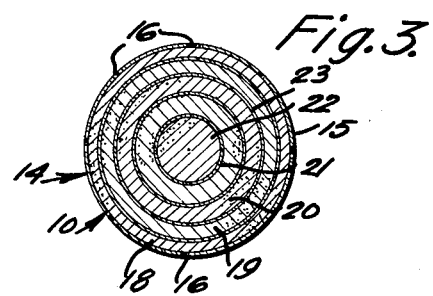
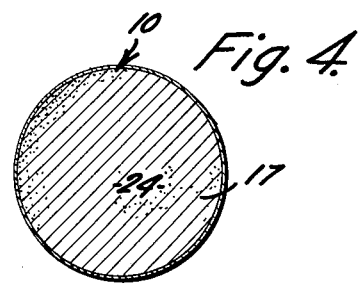
INVENTOR.
Jerry Pavek
BY
Victor G. Evans
Attorneys

United States Patent Office 3,060,012
Patented Oct. 23, 1962

3,060,012
FERTILIZER CARTRIDGE INSERT
Jerry Pavek, Polar, Wis.
Filed Aug. 23, 1960, Ser. No. 51,398
4 Claims. (Cl. 71—64)

This invention relates to fertilizer cartridge inserts, and more particularly to such an insert which is adapted to be arranged in the ground so as to provide a means for increasing efficiency or effectiveness with which plants or the like can be fertilized.

A primary object of the present invention is to provide a fertilizer cartridge insert which consists of a plurality of separate units or sections so that after one of the units dissolves and gives up its nutritional content to the soil after a predetermined period of time, another unit will start to dissolve, and wherein this process or the like will continue until the entire fertilizer cartridge insert is used up so that the fertilizer can be applied to the roots of the plants in the most effective and advantageous manner over a period of time whereby growth of the plants or other members will be aided in the most beneficial manner.

A further object is to provide a fertilizer cartridge insert which includes a lower pointed end so as to facilitate the placement of the same in the ground or soil, and wherein the present invention will insure that the fertilizer will be distributed onto the roots of the plants where the fertilizer can do the most good, the insert being constructed so that a portion of the fertilizer will be distributed into the soil, and then after a subsequent period of time, another portion of the fertilizer will be dissolved and distributed into the soil or ground, and this will continue so that there will be an even distribution of fertilizer to the roots of the plants or other crops or the like.

Still another object is to provide such a fertilizer cartridge insert which is economical to manufacture and use, efficient in operation, and which is foolproof in operation.

These and other objects of the invention will become apparent from a reading of the following specification and claims, together with the accompanying drawings, wherein like parts are referred to and indicated by like reference characters and wherein:

FIGURE 1 is an elevational view illustrating the fertilizer cartridge insert of the present invention in use.

FIGURE 2 is an enlarged elevational view, with the parts broken away and in section, illustrating the fertilizer cartridge insert of the present invention.

FIGURE 3 is a sectional view taken on the line 3—3 of FIGURE 2.

FIGURE 4 is a sectional view taken on the line 4—4 of FIGURE 2.

Referring in detail to the drawings, the numeral 10 indicates the fertilizer cartridge insert of the present invention which is adapted to be arranged in the ground or soil such as the soil 11 whereby fertilizer or nutriment can be conveniently supplied to the roots such as the roots 12 of a plant 13, FIGURE 1.

The fertilizer cartridge insert 10 of the present invention is shaped to include an outer casing 14 which includes a lower cone shaped or pointed end portion 17 as well as an upper cylindrical portion 15, and the upper cylindrical portion 15 is provided with a plurality of spaced apart apertures or openings 16, for a purpose to be later described.

As shown in FIGURE 3 for example, a plurality of concentric rings or units such as the units 18, 19, 20 and 21 are arranged in the upper portion 15 of the outer casing 14, and these units are adapted to be made of suitable fertilizer. A central core or fertilizer unit 22 may be arranged in the innermost unit 21, and cylindrical spacer members 23 are interposed between the various fertilizing units. The lower pointed portion 17 is also provided with fertilizer such as the fertilizer 24, FIGURE 2.

From the foregoing, it is apparent that there has been provided a fertilizer cartridge insert, and with the parts arranged as shown in the drawings, it will be seen that the insert 10 of the present invention is adapted to be positioned in the ground such as the ground 11, and the pointed lower end portion 17 facilitates the placement of the insert into the ground. The entire device is adapted to be made of a material which dissolves gradually into the soil or ground 11 so that nutriment or fertilizer will gradually be distributed through the soil 11 so that for example this nutritional fertilizer can be effectively distributed to roots such as the roots 12 of a tree, plant or the like as for example as indicated by the numeral 13 in FIGURE 1.

The device 10 includes the outer casing 14 which consists of the upper cylindrical portion 15 and has the openings 16 therein, and the outer casing 14 also includes the lower cone shaped portion 17 which is filled with fertilizer 24, and there is arranged in the upper portion 15 the plurality of concentric rings or fertilizer units 20 which are adapted to be of equal capacities. Thus, first the outer fertilizer ring 18 is adapted to dissolve, and then after a predetermined period of time the next fertilizer ring 19 is adapted to dissolve in the soil and then the fertilizer ring 20 will dissolve, and then at a later date the fertilizer ring 21 will dissolve and finally the core 22 will dissolve so as to give up its fertilizer contents to the growing plants or crops or the like. This arrangement serves to insure that the fertilizer will be distributed or directed into the soil or ground over a desired period of time rather than having the fertilizer placed in the ground all at one time, and by having this arrangement of permitting the fertilizer to only dissolve gradually and increments, it will be seen that the fertilizer can be applied or supplied to the roots in stages whereby the roots can receive the fertilizer as it is needed and in the most efficient manner.

The parts can be made of any suitable material and in different shapes or sizes.

The fertilizer may be of dry or liquid type, and the spacer members such as the spacer members 23 are adapted to be interposed between the concentric fertilizer rings. The rings are arranged so that equal capacities for all the rings is provided, and only the outer casing 14 has the perforations 16 to permit immediate action of the fertilizer when the cartridge is inserted into the soil in the vicinity of a tree or a shrub.

The thickness of the compartment walls or partitions or spacer members 23 as well as the resistance of these members will determine the period of time for each fertilizer ring to become dissolved by the moisture of the soil so as to release the fertilizer therein. In addition the amount of moisture proofing material added to the solid type of fertilizer cartridge insert will provide the correct ratio or rate of cartridge disintegration in the soil moisture to the time desired, and the outer casing may be covered with a label giving directions for use, the kind of fertilizer showing the percentage of each ingredient, as well as other data such as the manufacturer's name, and this label may be made of a thin moisture absorbing material to permit the soil moisture to commence rapid dissolving of the fertilizer for immediate action or results. The pointed portion 17 is hollow and a suitable fertilizer such as the fertilizer 24 is filled therein and arranged above the fertilizer 24 is a plurality of compartments which are defined by the cylindrical spacer members 23 and these compartments are also filled with fertilizer rings as previously stated. Each of these compartments define between the spacer members 23 (in the one year type) may provide fertilizer for a predetermined period of time such as from 3 months in each of the four compartments, so that by the end of the first three months, the wall or partition of compartment 2 is dissolved and its fertilizer will be released to the soil and this process will be repeated every three months so as to supply fertilizer for one year. In addition the fertilizer will be released under the soil among the roots of the plants where all of the ingredients are picked out by the roots of the plants so that none will be wasted as for example when surface fertilizing is made and the entire cartridge will then eventually be dissolved and provide food for the plant.

The cartridge insert of the present invention may include fertilizer together with other ingredients such as sawdust or other suitable binders and these can be mixed together and compressed into the desired shape, and the binding material is adapted to be of a nature so as to gradually decompose from the moisture in the soil over a period of several months so that the nutriments will gradually and continuously escape into the surrounding soil in order to provide food for the roots of the plants or shrubs or the like.

The fertilizer cartridge is adapted to be inserted into the soil away from trunks of small trees or shrubs a proper distance, and also the present invention can be used for larger trees or the like and other ingredients or materials may be used in the cartridge in addition to fertilizer such as peat moss, cotton seed hulls, fast decaying plastics or the like.

The present invention will provide an efficient and economical way of fertilizing plants, shrubs, trees, vines or the like and wherein with the present invention fertilizer can be applied to such growing plants continuously for long periods of time as for example up to two years without the need of human attendance, and the present invention will supply the fertilizer nutritional substances to plants in a more efficient and easier manner than can be done otherwise, and wherein loss of nutriments will be minimized or prevented, as for example as compared to application of fertilizer by hand.

In use, the fertilizer cartridge insert is inserted into the soil adjacent to the plant which is being fertilized, and while generally fertilizer is spread on top of the soil around the plant and then raked or watered, and even though efforts have been made previously to provide fertilizer inserts, it is believed that the present invention is an improvement over any of these prior methods or devices since with the present invention loss of nutriments will be minimized or prevented, and since fertilizer is in several compartments or units, after one unit is used up, the next unit will be dissolved and give up its nutriment to the immediate surrounding soil adjacent the roots of the plant so that the roots can pick up all of the nutriments without the usual loss. The fertilizer may be compressed into the cartridge insert, after having been mixed with a suitable material such as peat moss, ground corn cobs, cotton seed hulls, together with moisture proofing chemicals such as glue, casein, plastic or the like so as to insure that the fertilizer will dissolve slowly in moist soil, and eventually the entire cartridge will gradually disintegrate and release its nutriments for the roots of the plant to use continuously while over a long period of time such as up to two years without requiring any attention on the owner's part.

In the compartmented type of fertilizer cartridge insert, each of the compartments or ring units are of equal capacity so that the same amount of fertilizer is contained in each unit and this insures that a continuous and correct amount of fertilizer will be released throughout the duration of the life of the insert. The device can be made so that the time interval of dissolving of the various rings can be regulated or controlled as desired.

The spacer members or partitions are adapted to be made of thin material so that as the moisture in the soil acts upon these spacer members or partitions they will dissolve as for example one spacer member may dissolve every sixty days to provide a long time of supplying nutritional substances to trees and shrubs. A label is adapted to be used on the outside of the outer casing 14 and this label will serve the purpose of holding the fertilizer in so that the fertilizer for example cannot pass out through the openings 16 and in addition such label can be used for giving directions for use.

The cartridges can be made of different material and the material used for making the cartridges is adapted to be decided upon in the different applications of the fertilizer cartridge, but generally a cardboard treated with wax will be used in most cases of application, and as the paper decomposes it is used up by the plant as food. In some cases of lack of iron in the soil it will be advisable to make the cartridges of sheet metal so that as the cartridges decompose, they will furnish iron to the plants that require the same.

In connection with the fertilizer, per se, and in particular the analysis thereof, there are various formulas which are applicable as for example 8–16–16, which is adapted to be used for fertilizing acid loving plants such as rhododendrons, azaleas, camellias, epigeas, blue berries and the like, or for neutral soil requirement plants, a fertilizer such as 10–10–10 or 6–8–6 and still other types of fertilizers contain such trace elements as boron, molybdenum, calcium, magnesium, copper, sulphur, zinc, and manganese and the like where such elements are lacking or in insufficient amounts in the soil. This information would of course be printed on the labels covering the outer wall of the fertilizer cartridges.

Minor changes in shape, size and rearrangement of details coming within the field of invention claimed may be resorted to in actual practice, if desired.

What is claimed is:

1. In a fertilizer cartridge insert, an outer casing including a cone-shaped lower pointed portion and an upper cylindrical portion, fertilizer in said lower pointed portion, a plurality of separate concentric fertilizer units in said cylindrical portion, and cylindrical spacer members interposed between said concentric units, said spacer members being positioned above said cone-shaped lower pointed portion, the upper cylindrical portion of said casing having a plurality of apertures therein.

2. In a fertilizer cartridge insert, an outer casing including a cone-shaped lower pointed portion and an upper cylindrical portion, fertilizer in said lower pointed portion, a plurality of separate concentric fertilizer units in said cylindrical portion, and spacer members interposed between said concentric units, the upper cylindrical portion of said casing being provided with a plurality of apertures therein, and a cylindrical core in the innermost units.

3. In a fertilizer cartridge insert, an outer casing including a cone-shaped lower pointed portion and an upper cylindrical portion, fertilizer in said lower pointed portion, a plurality of separate concentric fertilizer units in said cylindrical portion, and spacer members interposed between said concentric units, the upper cylindrical portion of said casing being provided with a plurality of apertures therein, and a cylindrical core in the innermost units, said units and core being of equal capacity, and said units and core all containing the same quantity of fertilizer.

4. The structure as defined in claim 3 wherein said outer casing is made of a material which dissolves.

References Cited in the file of this patent

UNITED STATES PATENTS

| | | |
|---|---|---|
| 1,971,390 | Van Yahres | Aug. 28, 1934 |
| 2,032,608 | Antrim | Mar. 3, 1936 |
| 2,067,589 | Antrim | Jan. 12, 1937 |